Sept. 7, 1948.  H. W. ADAMS ET AL  2,448,649
DUPLEX FOUR-WAY VALVE
Filed April 17, 1944  2 Sheets-Sheet 1
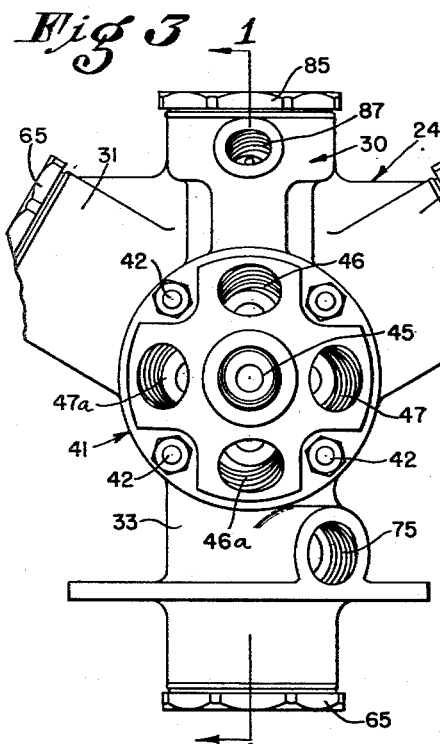
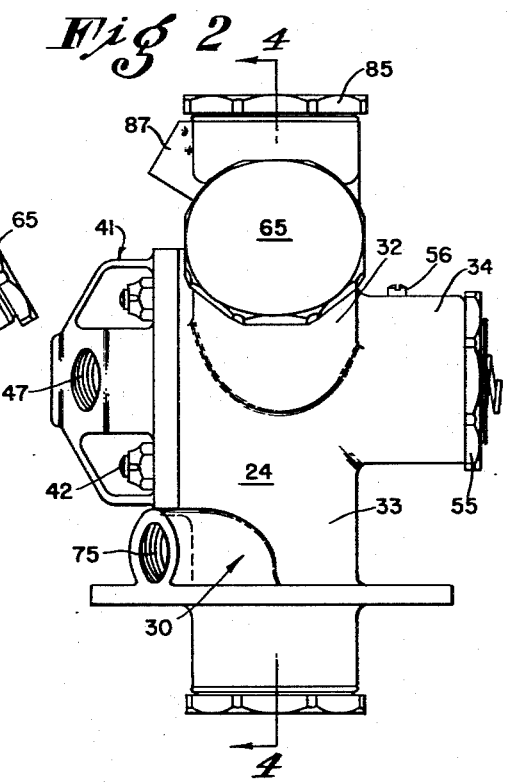
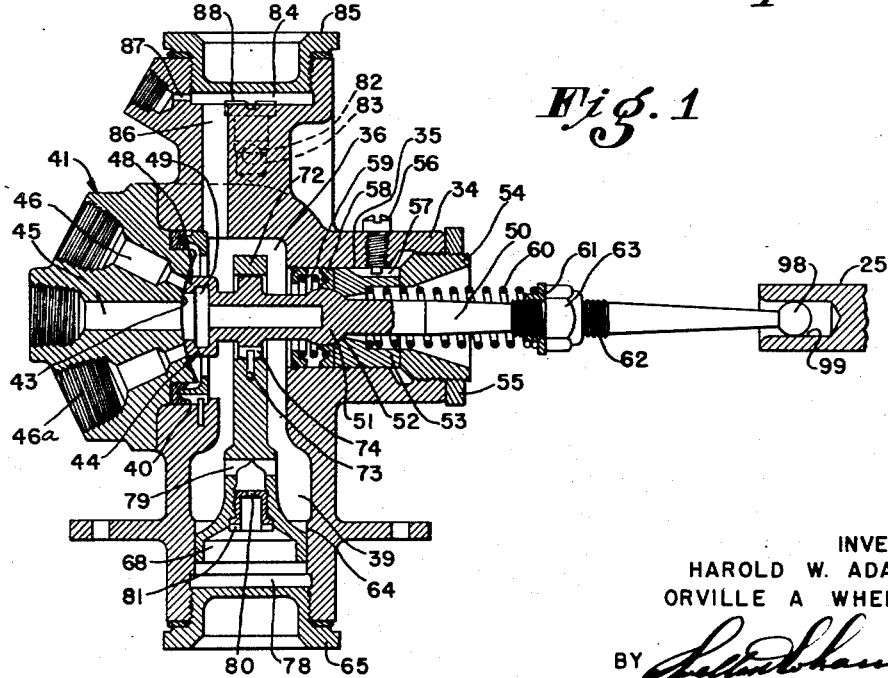
INVENTORS
HAROLD W. ADAMS
ORVILLE A. WHEELON
BY
ATTORNEY Sept. 7, 1948. H. W. ADAMS ET AL 2,448,649
DUPLEX FOUR-WAY VALVE
Filed April 17, 1944 2 Sheets-Sheet 2
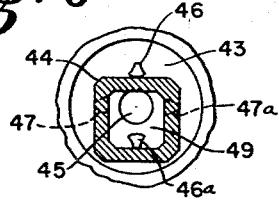
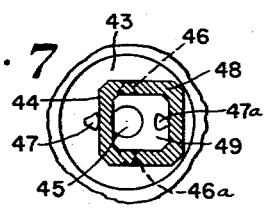
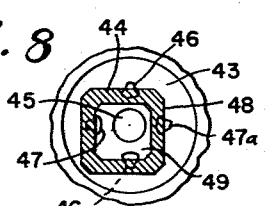
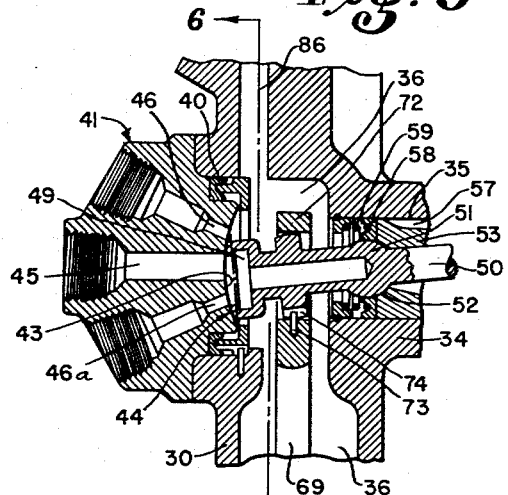
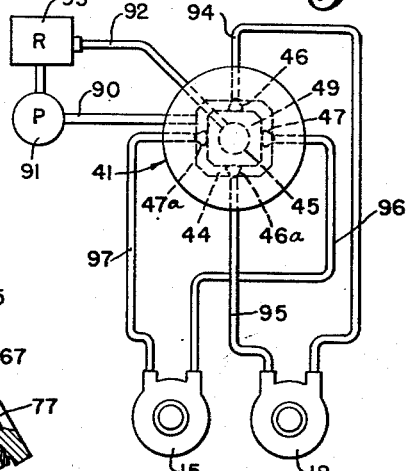
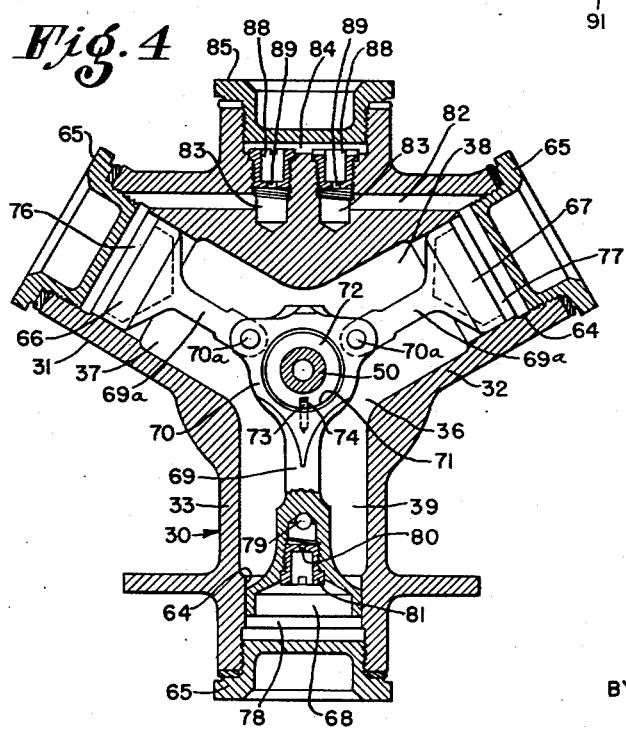
INVENTORS
HAROLD W. ADAMS
ORVILLE A. WHEELON
BY
ATTORNEY Patented Sept. 7, 1948

2,448,649

UNITED STATES PATENT OFFICE 2,448,649

DUPLEX FOUR-WAY VALVE

Harold W. Adams, Santa Monica, and Orville A. Wheelon, Pacific Palisades, Calif., assignors to Douglas Aircraft Company, Inc., Santa Monica, Calif.

Application April 17, 1944, Serial No. 531,390

6 Claims. (Cl. 251—18)

Our invention relates to multiple ported valves having a single movable part for controlling the flow of fluid through the various ports of the valve, and relates in particular to a valve of this type wherein movement of the control member results in opening one port to high pressure and another port to low pressure, such as a reservoir, to which fluid is returned from a fluid motor.

It is an object of the invention to provide a valve which, although it is suitable for other uses, has especial utility in controlling the operation of fluid motors employed to aim guns carried by swivel supports so as to have universal movement within a given angular range.

It is an object of the invention to provide a simple control valve, having a single universally movable valve part operative to control the application of fluid under pressure to one or more reversible hydraulic motors in such manner that the direction and speed of operation thereof may be easily controlled by appropriate movement of the valve part.

It is a further object of the invention to provide a valve of the character set forth in the foregoing paragraph having a universally swingable valve member of novel form mounted so that pressure applied thereto will be substantially balanced, with the result that the valve member may be moved in any of its directions of movement by the same application of pressure. For example, valves known to us for this use have required a pressure of about two pounds against the control member to produce initial movement of the valve element from one position to another, thereby resulting in a jerky movement of such valve member due to, first, the lag in the start of the movement of the valve element while the pressure is being applied and then to the movement of the valve element beyond its intended stopping position due to the application of this pressure required to produce the initial movement.

It is an object of the invention to provide a control valve having a spherical wall with fluid ports extending through this spherical wall, and a movable valve member supported so that it will have universal movement on the point around which the spherical surface of the wall is generated, and having a spherical face to engage the spherical surface of the wall, there being means for producing universal movement of the valve member so that the ports will be closed and opened in such a manner and to such degree that controlled flows of fluid under pressure will be delivered to the associated fluid driven motors to drive them at such relative velocity that the movement of the gun from an initial position will follow the direction in which the control member has been moved.

A further object of the invention is to provide a valve of this character which is of compact form and has its parts so arranged that the ducts of the system which it serves may be readily connected thereto. In the preferred form of the invention, six conduits are connected to the valve, but five of these conduits are connected to the cover plate of the valve so that the valve body may be removed from its position on a supporting structure after only one of the conduits, namely, the sixth, has been disconnected.

A further object of the invention is to provide a valve having a simple means for limiting the speed of movement of the closure member so that an abrupt change in flow through selected conduits cannot be caused by an inadvertent heavy pressure against the control lever of the valve.

Further objects and advantages of the invention will be brought out in the following part of the specification.

Referring to the drawings which are for illustrative purposes only:

Fig. 1 is a cross sectional view of a preferred embodiment of our invention taken on the line 1—1 of Fig. 3.

Fig. 2 is a side view of the body of the control valve forming a part of our invention.

Fig. 3 is a face view of the valve.

Fig. 4 is a sectional view taken on the plane indicated by the line 4—4 of Fig. 2.

Fig. 5 is a fragmentary sectional view of the central portion of Fig. 1, with the movable valve closure member displaced downward.

Fig. 6 is a diagrammatic view showing the closure member in downwardly displaced position relative to the ports of the valve plate, to correspond to the position thereof in Fig. 5.

Fig. 7 is a diagrammatic view similar to Fig. 6 showing the closure member in laterally displaced position.

Fig. 8 is another diagrammatic view similar to Fig. 6 showing the closure member in a diagonally offset position.

Fig. 9 is a schematic view showing a manner in which the valve may be employed.

Our duplex four-way valve 24 is shown in detail in Figs. 1 to 5 inclusive. It includes a body 30 of hollow construction having a central chamber and a plurality of radiating arms, preferably three in number and identified as 31, 32, and 33, and being directed outward in a common plane at angles of 120 degrees, with the arms 31 and 32 extending upwardly and outwardly and the arm 33 extending downwardly. As shown in Figs. 1 and 2, the body 30 has a central, rearwardly extending, hub 34 with a bore 35 on an axis perpendicular to the plane defined by the arms 31, 32, and 33. The body 30 has a chamber 36 which communicates with the inner end of the bore 35 and has radiating portions 37, 38, and 39 extending outwardly through the arms 31, 32, and 33. In the front or leftward wall of the body 30 there is a bore or opening 40 coaxial with the bore 35, and a ported body 41 is secured by means of stud bolts 42 in a position to close the opening 40.

The ported body 41 has an inwardly faced concave spheroidal surface 43 against which a hollow, square valve plate or closure member 44 is fitted, and a fluid return port extends substantially centrally through the body 41 so as to meet the center of the spheroidal face 43. In the ported body 41, service ports 46, 46a, 47, and 47a are arranged around the return port 45 in the manner shown in Figs. 6, 7, and 8, the ports 46, and 46a being respectively above and below the port 45, and the ports 47 and 47a being on opposite sides of the port 45.

The closure member 44 is of quadrilateral cross section as shown in Figs. 6 to 8, and has a quadrilateral lip 48 disposed around a central cavity or opening 49 which is continuously in communication with the return port 45 and has for its purpose to connect this return port 45 with selected service ports as shown in Figs. 6 to 8 inclusive, when the closure member 44 is moved from its centralized position shown in Fig. 1. The lip 48 of the closure member 44 is of such width that when the closure member is in centralized position as shown in Fig. 1, the lip 48 will close all of the service ports 46, 46a, 47, and 47a.

The closure member 44 is on the inner or leftward end of a universally swingable lever 50 which projects through the bore 35 and has thereon a spherical enlargement 51 to engage a spheroidal seat 52 formed at the inner end of a sleeve 53 which is adjustably held within the bore 35 by means of a threaded adjusting sleeve 54 which is secured in adjusted position by means of a lock nut 55. The sleeve 53 is held from rotation by a dog-pointed screw 56 threaded through the hub 34 so as to engage a slot 57 in the sleeve 53. A double lipped sealing ring 58 is placed in the bore 35 around the ball 51 of the lever 50 and is held in operative position by a spring 59. A balancing spring 60 is placed around the external portion of the lever 50 in such position that its inner end will engage the sleeve 53 and its outer end will engage a ring nut 61, locked in adjusted position on the threaded portion 62 of the lever 50 by means of a lock nut 63. The unbalanced area of the closure member 44 is preferably slightly larger than the area of that portion of the ball 51 in engagement with the spherical seat 52, with the result that the pressure on the lever 50 in axial direction is unbalanced in the direction of the concave spheroidal face 43. The pressure with which the closure member 44 is forced against the surface 43 may be adjusted by changing the compression in the spring 60, which is accomplished by movement of the ring nut 61 on the threaded portion 62 of the lever 50.

Rotation of the closure member 44 around the axis of the lever 50 is limited and to all practical purposes prevented by the following means which also serves to limit the acceleration in the movement of the lever 50. Cylinder bores 64 are formed near the outer ends of the radiating portions 37, 38, and 39 of the chamber 36, and the outer ends of these portions 37, 38, and 39 are closed by threaded plugs 65, as best shown in Fig. 5. Dashpot pistons 66, 67, and 68 are located in the cylinder bores 64. The lower piston 68 is rigidly connected by means of a radial arm 69 with a ring 70 having an opening 71 therein, this opening 71 receiving a spherical collar 72 formed on the lever 50 between the closure member 44 and the ball 51. A pin 73 projects inward from the ring 70 into a longitudinal slot 74 in the periphery of the collar 72 and restrains axial rotation of the lever 50 and the closure member 44 relative to the arm 69. The dashpot pistons 66 and 67 are pivotally connected to the ring 70 by radial arms 69a and pivots 70a. It will be noted that as the closure member 44 is swung from one side to another of its neutral position there will be a very slight rotation of the closure member 44 around its axis owing to the rotation of the arm 69 and the pin 73 about the center of the piston 68.

The chamber 36 of the valve body 30 has an inlet port 75 through which it receives fluid under pressure from a suitable source, and the dashpot chambers 76, 77, and 78, lying adjacent the outer ends of the pistons 66, 67, and 68 respectively, are all connected through restricted passages with the chamber 36. The lower dashpot chamber 78 is directly connected with the chamber 36 through a passage 79 which extends through the lower part of the radial arm 69, this passage 79 having a flow controlling orifice 80 formed in a plug 81 which threads into the lower portion of the passage 79 as shown in Fig. 4. The upper dashpot chambers 76 and 77 are connected to the chamber 36 through passages 82 which extend to the lower parts of threaded recesses 83 connected to a bleed chamber 84 formed in the upper part of the body 30 and being closed by means of a plug 85. This bleed chamber 84 is connected by means of a vertical passage 86 with the chamber 36, as shown in Fig. 1, and the bleed chamber 84 is provided with a passage or port 87 leading to the exterior of the valve body 30, thereby providing an arrangement of passages whereby all accumulations of gas or air may be bled from the upper part of the valve body. Plugs 88, having flow controlling orifices 89, are threaded into the recesses 83 so that a control of fluid to and from the upper dashpot chambers 76 and 77 is obtained.

The manner in which the valve 24 operates in a system for controlling a pair of reversible fluid motors 15 and 18 for pointing a gun or other universally mounted member is shown in schematic Fig. 9, wherein the ported body 41 with its ports 45, 46, 46a, 47 and 47a, and the rectangular closure member 44 are shown in dotted lines and the flows of fluid to the motors 15 and 18 may be readily traced. A pressure fluid delivery conduit 90 connects the inlet 75 of the chamber 36 with a suitable source represented as a pump 91, and a return conduit 92 connects with the return passage 45 so that the discharged hydraulic fluid may be carried to a reservoir 93. The ports 46 and 46a are respectively connected through conduits 94 and 95 with the motor 18, and the ports 47 and 47a are connected respectively through conduits 96 and 97 with the motor 15. The lever or stem 50 of the valve 24 is shown as being directly connected to a control member 25 so that it will have movement in accordance with the movement of the control member. For this connection, we have shown a ball 98 on the outer end of the lever 50 which, as shown in Fig. 1, makes sliding engagement with the bore 99 of the controlling member 25. Accordingly, any lateral movement of the member 25 will produce a movement of the lever 50 to move the closure member 44. When the lever 50 is in centralized position, as shown in Fig. 1, the service ports 46, 46a, 47, and 47a will be closed by the member 44, and there will be no flow of pressure fluid from the chamber 36 of the valve through any of the conduits 94, 95, 96, or 97 to the fluid operated motors 15 and 18. In one operation of the valve 24, the member 25 may be swung upward, causing the rectangular closure member 44 of the valve to swing downward toward or into the position thereof shown in Figs. 5 and 6, connecting the service port 46 with the chamber 36 and connecting the service port 46a through the opening 49 with the return passage 45. Accordingly, pressure fluid will flow from the chamber 36 out through the conduit 94 to the fluid operated motor 18, and then back through the conduit 95, the port 46a and the opening 49 to the return passage 45 which is connected to the return conduit 92, with the result that the motor 18 will be driven in one direction. A downward displacement of the front end of the lever 50 will raise the closure member 44 so as to reverse the connection of the ports 46 and 46a with the pressure fluid supply and the return line, so that the pressure fluid will flow out through the port 46a, and the conduit 95, to the motor 18, and will be returned to the valve 24 through the conduit 94, thereby causing a reverse operation of the motor 18.

Lateral swinging of the lever 50 results from operation of the motor 15 in either direction. Fig. 7 shows the rectangular closure member 44 rightwardly offset from centralized position to connect the service ports 47 and 47a respectively with the chamber 36 and the return passage 45, whereby operation of the motor 15 in one direction is accomplished. It is evident that a movement of the member 44 in leftward direction from centralized position will feed fluid through the motor 15 in opposite direction. Simultaneous operation of the motors 15 and 18 is accomplished by a simultaneous opening of a pair of service ports to receive pressure fluid from the chamber 36, this being accomplished by a diagonal movement of the closure member 44 resulting from a diagonal movement of the front end of the lever 50. For example, downward and leftward movement of the closure member 44 to connect ports 46 and 47a with the chamber 36 and ports 46a and 47 with the return passage 45, as shown in Fig. 8, whereby fluid under pressure will be fed through both motors.

A further object of the invention is to maintain the speed of the motors 15 and 18 directly proportionate to the movement of the member 44 from centralized position.

In Figs. 6, 7, 8, and 9, we show the service ports 46, 46a, 47, and 47a formed with cross-sectional areas which increase in width from the outer extremities thereof toward the inner extremities, so that the rate of increase in the opening port area will be greater than rate of displacement of the lip of the valve member 44, this increase in effective port area being such that it will compensate for friction head pressure drop and thereby maintain in the conduits leading to the motors fluid velocities which are proportionate to the displacement of the closure member 44.

We claim as our invention:

1. In a control valve of the character described, the combination of: a hollow body having spaced walls, one of said walls having an interior concave spheroidal face with port means therein, and the other of said walls having an opening opposite said face; a swingable member extending through said opening into said body, having on the inner portion thereof a closure member for sliding engagement with said face; a spherical shoulder carried by said swingable member; means sleeving said swingable member slidably mounted in said opening; a concave spherical seat formed on said sleeving means for receiving said shoulder and cooperating therewith for supporting said swingable member for universal movement whereby said closure member may be moved relative to said spheroidal face; adjustable means engaging said sleeving means for positively holding said seat against said shoulder and said swingable member in a position in which said closure member is maintained in good sealing engagement with said spheroidal face; and means forming a seal between said swingable member and said opening.

2. In a control valve of the character described, the combination of: a hollow body having spaced walls, one of said walls having an internal concave spheroidal face and the wall opposite said first named wall having an opening therethrough, said first wall having a plurality of service ports symmetrically arranged about a centrally located exhaust passage; a swingable member extending through said opening; a closure member rigidly carried by the inner end of said member for sliding engagement with said concave spheroidal face, for closing and unclosing said service ports; means for sealing said opening around the portion of said swingable member which passes therethrough; means supporting said swingable member so that it will pivot substantially on the center point around which said spheroidal face is generated; and means carried by said body for adjusting the supporting means for positively holding said closure member in good sealing engagement with said spheroidal face.

3. In a control valve of the character described, the combination of: a hollow body having spaced walls, one of said walls having an internal concave spheroidal face and the other of said walls having an opening therethrough, said first wall having a central exhaust port and a plurality of service ports arranged therearound in an area of said spheroidal face; a swingable member extending through said opening; a closure member rigidly carried by the inner end of said swingable member, said closure member comprising a cavity confronting said face and being in communication with said exhaust port, a lip around said cavity for sliding engagement with said face, said lip being formed so as to cover said service ports when it is in neutral position; means carried by said swingable member and cooperative with means slidably mounted in said opening for supporting said swingable member so that it will have universal movement around a point substantially connected with the point about which said spheroidal face is generated so that said closure member may be moved over said spheroidal face to open a selected part of said service ports to said cavity and another part of said ports to the space within said body; means for sealing said opening around the portion of said swingable member which passes therethrough; and means carried by said body for engaging and holding said slidably mounted supporting means in a position in which said closure member is positively held in good sealing engagement with said spheroidal face.

4. In a control valve of the character described, the combination of: a hollow body having spaced walls, one of said walls having an interior concave spheroidal face with port means therein, and the other of said walls having an opening opposite said face; a swingable member extending through said opening into said body, having on the inner portion thereof a closure member for sliding engagement with said face; means carried by said swingable member cooperating with means slidably mounted in said opening and forming a universal joint supporting said swingable member so that it will swing substantially on the point around which said spheroidal face is generated; means forming a seal between said swingable member and said opening, said sealing means including resilient means applying a force to said swingable member tending to move the same away from said spheroidal face; and means carried by said body for positively holding the means slidably mounted in said opening in engagement with the cooperating means of said swingable member and solidly resisting the action of said resilient means, the engagement between the means carried by said body and said slidably mounted means holding the swingable member in a position in which said closure member is positively held in good sealing engagement with said spheroidal face.

5. In a control valve of the character described, the combination of: a hollow body having spaced walls, one of said walls having an internal concave spheroidal face and the other of said walls having an opening therethrough, the spheroidal face of said first wall having a plurality of service ports symmetrically arranged about a centrally located exhaust passage; a swingable member extending through said opening; a closure member rigidly mounted on the inner end of said swingable member and slidably engaging said concave spheroidal face for closing and unclosing said service ports; means for sealing said opening around said swingable member; and means for positively holding said swingable means in a position in which said closure member is positively held in good sealing engagement with said spheroidal face, said holding means cooperating with said sealing means for supporting said swingable member so that it will pivot substantially on the center point around which said spheroidal face is generated.

6. In a control valve of the character described, the combination of: a hollow body having spaced walls, one of said walls having an internal concave spheroidal face, the wall opposite the said face having an opening therethrough, another of said walls having an inlet opening adapted to be connected to a source of fluid under pressure, the spheroidal face of said first wall having a plurality of service ports symmetrically arranged about a centrally located exhaust passage; a swingable member extending through said opening; a closure member rigidly mounted on the inner end of said swingable member; a lip formed about the periphery of said closure member with one face thereof engaging said spheroidal face for closing said service ports in one position thereof; means for sealing said opening around said swingable member; and means for positively holding said swingable means in a position in which said closure member is positively held in good sealing engagement with said spheroidal face, said holding means cooperating with said sealing means for supporting said swingable member so that it will swing substantially about the center around which said spheroidal face is generated, whereby said closure member can be slidably moved in any direction across said spheroidal face, each of said service ports defining a cross-sectional area the width of which decreases from its inner end toward its outer end whereby the rate of movement of said closure member will be less than the rate of increase in area of the port opened to fluid flow from said inlet opening and greater than the rate of increase in area of the port opened to discharge fluid to said exhaust opening.

HAROLD W. ADAMS.
ORVILLE A. WHEELON.

REFERENCES CITED

The following references are of record in the file of this patent:

UNITED STATES PATENTS

| Number | Name | Date |
| --- | --- | --- |
| 1,790,168 | Paul | Jan. 27, 1931 |
| 2,020,286 | Bittle | Nov. 12, 1935 |
| 2,209,418 | Overbeke | July 30, 1940 |

FOREIGN PATENTS

| Number | Country | Date |
| --- | --- | --- |
| 10,226 | Norway | Dec. 16, 1901 |
| 342,463 | Germany | Oct. 18, 1921 |